June 26, 1923.

G. E. HALLENBECK 1,460,155

CLUTCH CONTROL MECHANISM

Filed Oct. 17, 1918

Geo E Hallenbeck Inventor

By Geo E Kirk

Attorney

June 26, 1923.

G. E. HALLENBECK

CLUTCH CONTROL MECHANISM

Filed Oct. 17, 1918

Inventor
Geo E Hallenbeck
By
Geo E Kirk
Attorney

Patented June 26, 1923.

1,460,155

UNITED STATES PATENT OFFICE.

GEORGE E. HALLENBECK, OF TOLEDO, OHIO, ASSIGNOR TO BAKER BROTHERS, OF TOLEDO, OHIO, A FIRM.

CLUTCH-CONTROL MECHANISM.

Application filed October 17, 1918. Serial No. 258,584.

*To all whom it may concern:*

Be it known that I, GEORGE E. HALLENBECK, a citizen of the United States of America, residing at Toledo, Lucas County, Ohio, have invented new and useful Clutch-Control Mechanisms, of which the following is a specification.

This invention relates to control mechanism for a driven member.

This invention has utility when incorporated as a clutch actuator, especially for compact embodiment in multiple operations.

Referring to the drawings.

Figure 1:
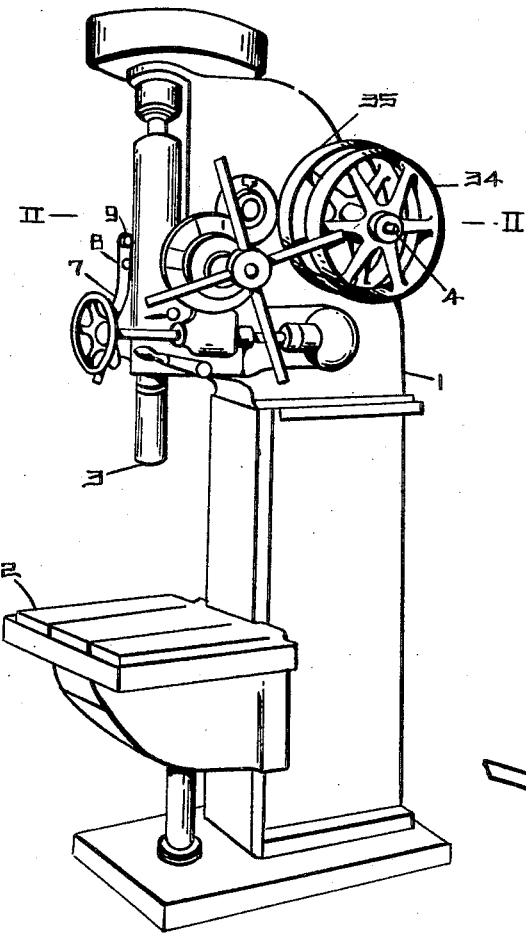
Fig. 1 is a perspective view of a drill press having interior control mechanism for a pair of clutches.
Figure 3:
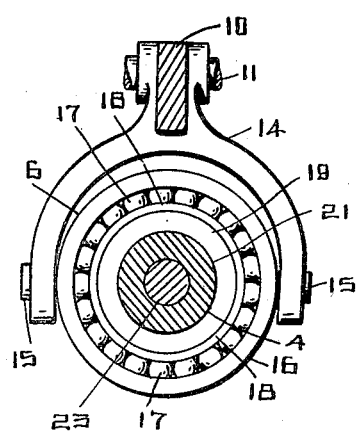
Fig. 3 is a section on the line III—III, Fig. 2.
Figure 5:
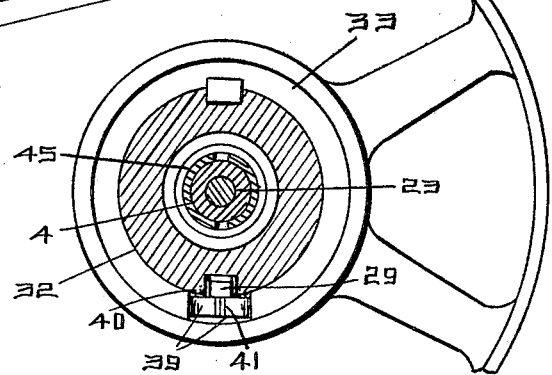
Fig. 5 is a section on the line V—V, Fig. 2.

The machine tool or drill press has the main frame 1, the work holding table 2 and the axially reciprocable rotary tool holder 3. Extending transversely of the frame 1, rearwardly from the vertical holder 3 is a main driving shaft 4. This horizontal shaft 4 has bearings 5, 6, in the frame 1.

In convenient position for the machine tool operator is disposed the lever 7 having fulcrum bearing 8 carried by the frame 1. The upper arm of this lever 7 is connected to link 9 disposed in the frame 1 and extending rearwardly below the shaft 4 to engage arm 10 of an angle lever having fulcrum bearing pin 11 extending vertically in auxiliary internal bracket 12 anchored in the frame 1 by pins 13. Approximately at right angles from the arm 10, the angle lever has forked arm 14 engaging diametrically disposed trunnions 15 of outer bearing ring 16, which has a raceway for an annular series of bearing balls 17. An inner opposing bearing ring 18 has a raceway for the balls 17. This inner ring 18 embraces the shaft 4 on which it is mounted by means of a sleeve 19.

The shaft 4 has a concentric tubular portion 20 with which there is lateral communication through diametrically disposed slots 21 in the portion of the shaft 4 in the frame 1, while an additional slot 22 is in the portion of the shaft 4 protruding from the frame 1.

Disposed in the tubular portion of the shaft 4 is a relatively reciprocable stem or rod 23 engaged by a key 24 protruding through the slots 21 and sleeve 19, and there is a collar 25 mounted on sleeve 19, thus constituting an assembled swivel or crosshead for transmitting rocking of the lever 7 through the angle lever 10, 14, in reciprocating the stem 23 in the rotatable shaft 4.

Mounted on the portion of the shaft 4 protruding from the frame 1 is hub member 26 embracing the slot 22 of the shaft 4, in the region of the slot 22, the stem 23 is provided with a rack 27. Mounted in the member 26 is a pinion 28 in mesh with the rack 27 on the inner side thereof, while on its outer side it coacts with a rack 29 of a member 30 reciprocable in a guide way 31 of the hub member 26 keyed to rotate with the shaft 4.

Axial extensions 32 of the hub member 26 carry split rings 33, which in expansion may effect frictional clutching respectively in the hubs of driving wheels or pulleys 34, 35, say for speed variation or reverse driving in a quick and simple manner. The rings 33 are keyed to the portions 32 of the member 26.

Figure 2:
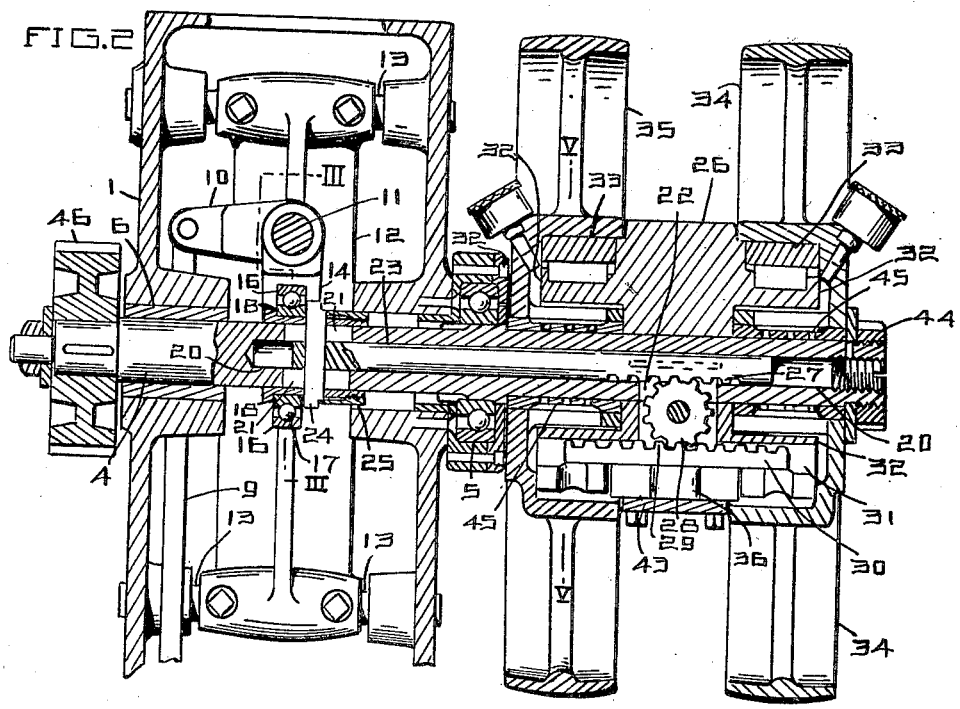
Fig. 2 is a partial section on the line II—II, Fig. 1.

The control of such clutching operation from intermediate or neutral position of Fig. 2, is effected from the lever 7 by wedge member 36 having terminal wedging bevel portions 37 effective in one direction of its movement and similar wedging bevel portions 38 effective in the opposite direction of its movement with the member 30 with which it is fixed. A pair of locking levers 39 is mounted in each split clutch ring 33 by pins 40, having the rocking engaging prying faces 41 and the long arms terminating in wedge bevel engaging or coacting portions 42. Plate 43 encloses the central portion of the wedge, while nut 44 may maintain assembly of the wheels and hub member on the shaft 4, the wheels 34, 35, having bearings 45 for loose pulley running on the shaft 4 when not clutched therewith. Pinion 46 on the shaft 4 at the opposite side of the frame 1 from the pulleys 34, 35, may during the operation of the shaft 4 serve as a transmission device for the feed or other features of the drill press construction.

In operation, a central position of the lever 7, has the control mechanism positioned in neutral or non-driving position as shown in Fig. 2.

Figure 4:
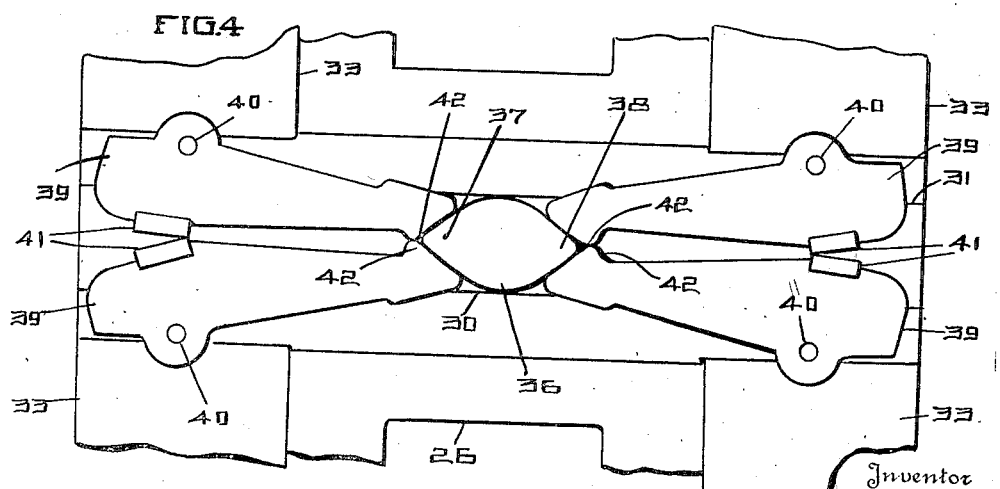
Fig. 4 is a plan of the wedge and levers.

For clutching the wheel 34 for driving the shaft 4, the link 9 is moved inward by the lever 7, rocking the angle lever 10, 14, on its bearing 11, to draw the stem 23 more into the frame 1, thus rotating the pinion 28 (Fig. 2) counter-clockwise and urging the wedge bevel portions 38 between the ends 42 of the pair of levers 39 at the right in Fig. 4, thus expanding clutch split ring 33 in the pulley or wheel 34, so that friction driving of the shaft 4 occurs therefrom through the member 26 fast with the shaft 4, to transmit power therefrom by gear 46 in operating the machine tool. To discontinue such driving, a swinging of the lever 7 to central position, positively withdraws the wedge bevel portions 38 from the levers 39, allowing the spring of the ring 33 to act in automatic release of the wheel 34 for idle running again on the shaft 4. An opposite movement from that clutching the wheel 34 is effective for engaging the wheel 35 for driving the shaft 4.

In this embodiment, there is a minimum of overhang or spacing between the pair of wheels to be clutched or controlled in this driving combination. There is an enclosed simple and compact positive control with entire absence of external moving parts adjacent the wheels controlled, so that the direction of drive thereto may be arranged as may be convenient with entire disregard of clutch control. With the load to be transmitted, the compact arrangement is a great factor in proper strength proportioning which may be readily cared for without excessive weight introduction due to the short overhang.

What is claimed and it is desired to secure by Letters Patent is:

1. A rotary driving member, a split ring for engaging the member, a pair of levers between the ends of the split ring and rockable to spread the ring, a tubular shaft for the driving member, said shaft having a radial opening, a stem reciprocable in the shaft axially of the shaft, and means actuable from the stem and coacting through said opening to engage between the levers for rocking the levers.

2. In a split ring clutch, a pair of locking levers for the clutch, a wedge for actuating the levers, and a rotary shaft embraced by said split ring in combination with a controller for the clutch including a reciprocable stem concentrically disposed in said shaft and provided with rack and pinion connection for positioning the wedge.

3. A rotary shaft, a pair of clutches, each embodying a split ring, said split rings being axially spaced along said shaft, means extending from between the ends of each split ring toward the other split ring, a reciprocable control stem in said shaft, said shaft having a radial slot from said stem between the means, and a double ended wedge actuable from the control stem into different positions for controlling different clutch rings.

4. A rotary shaft, a pair of split ring clutches axially spaced therealong, a pair of locking levers for each clutch, said levers having the actuating arms thereof extending toward each other, said shaft being provided with a central way having a radial opening in the region between the actuating arms of the levers, an actuator in the way, and control means shiftable by the actuator through said opening including a member movable in one direction to engage the arms of one pair of levers to bring their clutch into action, and in the other direction to engage the other pair of levers to bring the other clutch into action.

5. A machine tool provided with a frame forming a housing, a shaft in the housing, bearings in the housing spaced apart along the shaft for mounting the shaft in the housing, and a drive control for the tool extending internally of said housing and comprising an operating lever mounted on the frame, a link in the frame extending from the lever, an angle lever to which the link extends, a first ring to which the angle lever is connected, a second ring relatively rotatable as to the first ring for mounting the first ring on the shaft between the bearings for the shaft, said rings being anchored against relative movement longitudinally of the shaft, said shaft having radial slots, driving control means reciprocable in the shaft, connecting means from the second ring through one of said slots to the control means for causing simultaneous longitudinal movement of the rings to operate the control means, a clutch on the shaft intermediate its length, and additional connections from the control means through a second slot for operating said clutch.

6. An operating device for the lever pair of a split ring clutch embodying a wedge coacting for spreading the ring through the lever pair, a rack fixed with the wedge, a pinion coacting with the rack, a tubular shaft concentric with the split ring and slotted, a stem reciprocable in said shaft and provided with a rack co-acting through a slot of the shaft with the pinion, a key protruding through another slotted portion of the shaft and engaging the stem, a shaft embracing sleeve in which the key is mounted, a roller bearing ring mounted on the sleeve, balls in the ring, an opposing bearing ring coacting with the balls, and means for reciprocating this latter ring and thereby controlling the position of the clutch wedge.

7. An operating device for the lever pair of a split ring clutch embodying a wedge coacting for spreading the ring through the lever pair, a rack fixed with the wedge, a pinion coacting with the rack, a tubular shaft concentric with the split ring and slotted, a stem reciprocable in said shaft and provided with a rack coacting through a slot of the shaft with the pinion, and actuating means for reciprocating the stem.

In witness whereof I affix my signature.

GEO. E. HALLENBECK.